US 8,334,931 B2

(12) United States Patent
Nishio et al.

(10) Patent No.: US 8,334,931 B2
(45) Date of Patent: Dec. 18, 2012

(54) IMAGE PROCESSING APPARATUS AND IMAGE PROCESSING METHOD FOR PERFORMING CORRECTION PROCESSING ON INPUT VIDEO

(75) Inventors: Taisuke Nishio, Tokyo (JP); Yuuki Shindo, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 269 days.

(21) Appl. No.: 12/764,384

(22) Filed: Apr. 21, 2010

(65) Prior Publication Data

US 2010/0271553 A1    Oct. 28, 2010

(30) Foreign Application Priority Data

Apr. 23, 2009   (JP) ................................ 2009-104776

(51) Int. Cl.
*H04N 9/64* (2006.01)
*H04N 5/57* (2006.01)
*H04N 7/01* (2006.01)
*H04N 11/20* (2006.01)

(52) U.S. Cl. ........ 348/674; 348/650; 348/687; 348/700; 348/441; 348/443; 348/459

(58) Field of Classification Search .................. 348/674, 348/650, 687, 700, 701
See application file for complete search history.

(56) References Cited

U.S. PATENT DOCUMENTS

| | | | | |
|---|---|---|---|---|
| 7,667,739 B2* | 2/2010 | Hsuan | .................. | 348/222.1 |
| 7,705,919 B2* | 4/2010 | Suzuki et al. | .................. | 348/672 |
| 8,130,325 B2* | 3/2012 | Iwakura et al. | ............... | 348/687 |
| 2005/0184952 A1* | 8/2005 | Konno et al. | .................. | 345/102 |
| 2006/0227396 A1 | 10/2006 | Sugimoto et al. | ............. | 358/521 |
| 2008/0030450 A1* | 2/2008 | Yamagishi et al. | ............. | 345/89 |
| 2008/0055482 A1* | 3/2008 | Sugimoto | .................... | 348/700 |
| 2008/0186413 A1* | 8/2008 | Someya et al. | ............... | 348/739 |
| 2008/0247665 A1* | 10/2008 | Hsu | ............................... | 382/274 |
| 2009/0002562 A1* | 1/2009 | Yokoyama et al. | ........... | 348/673 |
| 2009/0262248 A1* | 10/2009 | Mori et al. | .................... | 348/687 |
| 2010/0080459 A1* | 4/2010 | Dai et al. | ...................... | 382/170 |
| 2010/0171884 A1* | 7/2010 | Saitou | .......................... | 348/674 |
| 2010/0302453 A1* | 12/2010 | Paschalakis et al. | .......... | 348/702 |

FOREIGN PATENT DOCUMENTS

| | | |
|---|---|---|
| JP | 2001-169143 | 6/2001 |
| JP | 2004-302045 | 10/2004 |
| JP | 2006-319953 | 11/2006 |
| JP | 2007-074439 | 3/2007 |

* cited by examiner

*Primary Examiner* — Brian Yenke (74) *Attorney, Agent, or Firm* — Fitzpatrick, Cella, Harper & Scinto (57) ABSTRACT

An image processing apparatus according to the present invention extracts a characteristic value of a luminance in relation to respective fields of an input video, and determines the presence of a scene change between adjacent fields. A gamma curve is then generated on the basis of the magnitude of the characteristic value. When a difference in the characteristic value between fields is larger than a predetermined value and a scene change does not exist, the gamma curve to be applied to a subsequent field is modified such that the correction characteristic of the gamma curve does not vary rapidly. The luminance is then corrected using the modified gamma curve.

10 Claims, 7 Drawing Sheets

FIG. 7C

IMAGE PROCESSING APPARATUS AND IMAGE PROCESSING METHOD FOR PERFORMING CORRECTION PROCESSING ON INPUT VIDEO

BACKGROUND OF THE INVENTION

1. Field of the Invention

The present invention relates to an image processing apparatus and an image processing method for performing correction processing on an input video.

2. Description of the Related Art

In a known technique for improving the image quality of a displayed video, a gamma characteristic of an input video is modified by detecting characteristics of the input video. A technique of this type is described in Japanese Patent Application Publication No. 2001-169143, for example. In another known technique, a gamma curve representing the gamma characteristic is generated dynamically. A technique of this type is described in Japanese Patent Application Publication No. 2006-319953, for example. Normally, measures are taken during this type of processing to modify the gamma characteristic gently to prevent viewer discomfort when a contrast and so on of the input video varies rapidly.

Meanwhile, a cinema video of a motion picture is constituted by 24 frames per second and is converted into a 60 frames-per-second television signal using 2-3 pulldown processing. In another known technique, appropriate image processing is performed when a television signal receiver determines that an input video has undergone 2-3 pulldown processing, and as a result, a high-quality cinema video is displayed. A technique of this type is described in Japanese Patent Application Publication No. 2007-74439, for example.

Further, a video display apparatus that displays a video having a larger number of frames than the number of frames of an input video using frame rate conversion processing exists. For example, when a 2-3 pulldown-processed video is displayed on an apparatus for displaying a 120 frames-per-second video, a 120 frames-per-second display can be realized by displaying each frame of the cinema video five times consecutively (24 frames per second×5=120 frames). A technique for displaying a high-quality cinema video in this manner is described in Japanese Patent Application Publication No. 2004-302045, for example.

SUMMARY OF THE INVENTION

However, when a 2-3 pulldown-processed video is displayed or when each frame of a cinema video is displayed five times, the same frame is displayed repeatedly. Meanwhile, when a method of displaying the same frame twice consecutively is employed during frame rate conversion to convert a 60 Hz video into 120 Hz, the same frame is likewise displayed repeatedly. Processing for suppressing rapid variation in the gamma characteristic, as described above, is conventionally performed in these cases also. Accordingly, processing is performed to vary the gamma characteristic gently even when an image does not vary between frames. As a result, it becomes impossible to display the same image repeatedly with accuracy, and therefore the original video cannot be reproduced.

Furthermore, conventionally, processing to suppress rapid variation in the gamma characteristic is performed without taking into consideration the presence of a scene change. However, in the case of a scene change, a user does not experience a sense of discomfort even when the gamma characteristic varies rapidly. When variation is suppressed regardless, a reproduction quality of the original video deteriorates, leading to phenomena such as a loss of sharpness in the video.

The present invention has been designed in consideration of these circumstances, and an object thereof is to provide an image processing apparatus or method which, during correction processing of an input video, applies a suitable gamma curve for reproducing an original video, taking into account the presence of a scene change, frame rate conversion processing, and so on.

An image processing apparatus according to this invention is that, an image processing apparatus comprising:

a characteristic extraction unit that extracts a characteristic value of a luminance in relation to respective input images constituting an input video and detects the presence of a scene change between adjacent input images;

a control unit that determines a luminance correction curve to be applied to output images corresponding to the respective input images on the basis of a magnitude of the characteristic value extracted by the characteristic extraction unit; and a luminance correction unit that corrects a luminance of the respective output images, using the luminance correction curve determined by the control unit, wherein, when a difference in the characteristic value between a first input image and a subsequent second input image is larger than a predetermined value and a scene change does not exist between the first input image and the second input image, the control unit determines a luminance correction curve having an intermediate correction characteristic between a luminance correction curve corresponding to a characteristic value of the first input image and a luminance correction curve corresponding to a characteristic value of the second input image as a luminance correction curve to be applied to an output image corresponding to the second input image, and when the difference in the characteristic value is smaller than the predetermined value or a scene change exists between the first input image and the second input image, the control unit determines the luminance correction curve corresponding to the characteristic value of the second input image as the luminance correction curve to be applied to the output image corresponding to the second input image.

An image processing method according to this invention is that, an image processing method comprising the steps of:

extracting a characteristic value of a luminance in relation to respective input images constituting an input video;

detecting the presence of a scene change between adjacent input images;

determining a luminance correction curve to be applied to output images corresponding to the respective input images on the basis of a magnitude of the extracted characteristic value; and correcting a luminance of the respective output images using the determined luminance correction curve, wherein, when a difference in the characteristic value between a first input image and a subsequent second input image is larger than a predetermined value and a scene change does not exist between the first input image and the second input image, a luminance correction curve having an intermediate correction characteristic between a luminance correction curve corresponding to a characteristic value of the first input image and a luminance correction curve corresponding to a characteristic value of the second input image is determined in the determining step as a luminance correction curve to be applied to an output image corresponding to the second input image, and when the difference in the characteristic value is smaller than the predetermined value or a scene change exists between the first input image and the second input image, the luminance correction curve corresponding to the characteristic value of the second input image is determined in the determining step as the luminance correction curve to be applied to the output image corresponding to the second input image.

According to the present invention, during correction processing of an input video, a suitable gamma curve for reproducing an original video can be applied, taking into account the presence of a scene change, frame rate conversion processing, and so on.

Further features of the present invention will become apparent from the following description of exemplary embodiments with reference to the attached drawings.

BRIEF DESCRIPTION OF THE DRAWINGS

FIG. 3A is a view showing an output timing from a characteristic extraction unit according to a first embodiment, while

FIG. 6A is a view showing the constitution of an input video according to a third embodiment, while FIG. 7A is a view showing the constitution of an input video according to a fourth embodiment, while

DESCRIPTION OF THE EMBODIMENTS

Preferred embodiments of the present invention will be described in detail below with reference to the drawings.

(First Embodiment)

Figure 1:
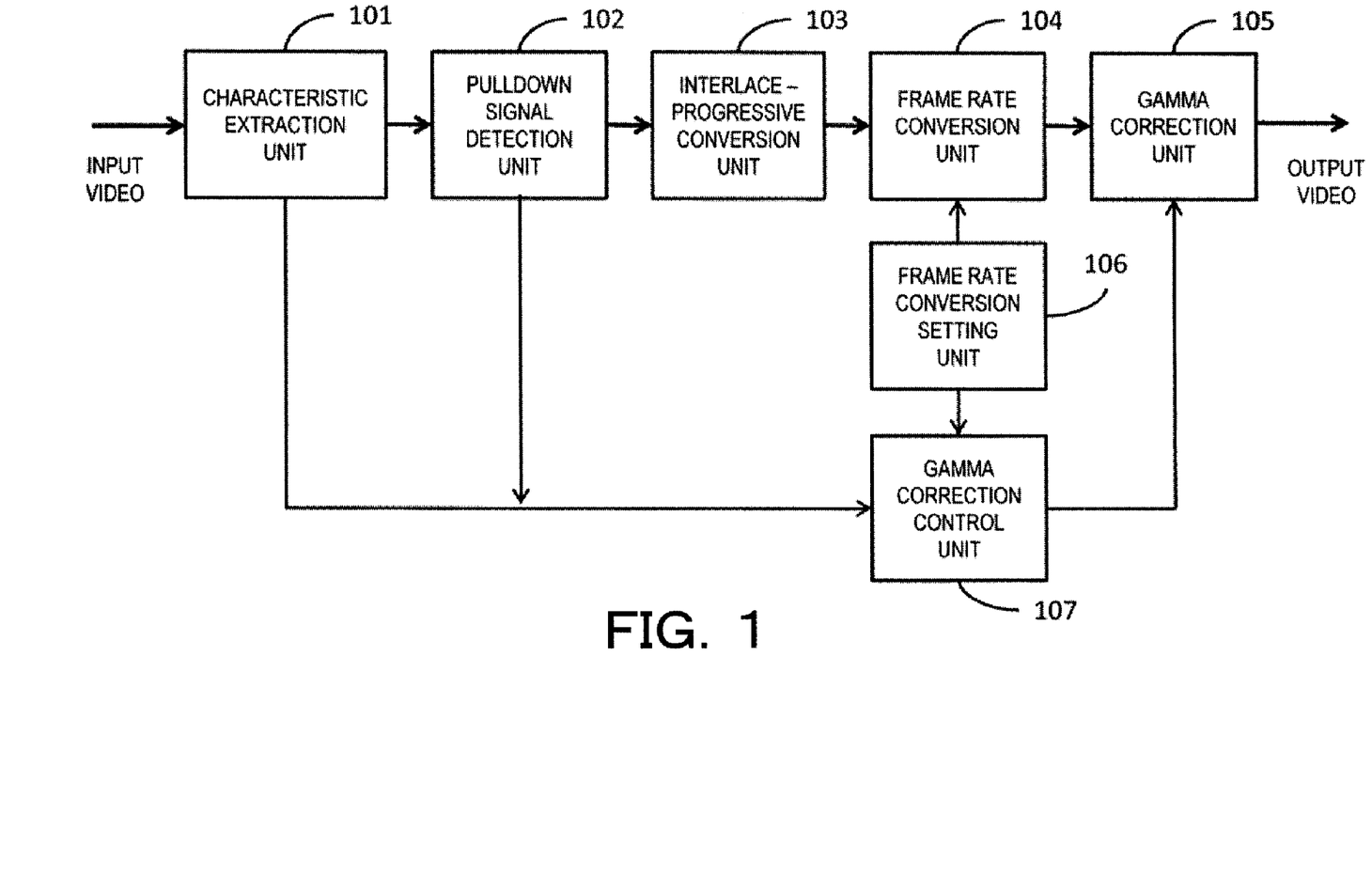
FIG. 1 is a block diagram showing the constitution of an image processing apparatus.

The constitution of an image processing apparatus will now be described using the block diagram shown in FIG. 1. The image processing apparatus includes blocks constituted by a characteristic extraction unit 101, a pulldown signal detection unit 102, a interlace-progressive conversion unit 103, a frame rate conversion unit 104, a gamma correction unit 105, a frame rate conversion setting unit 106, and a gamma correction control unit 107. In the drawing, thick arrows indicate the course of an input video as it passes through various processes to become an output video, while thin arrows indicate the flow of control data and so on. The image processing apparatus according to the present invention functions to extract an input video from a received broadcast wave, implement image improvement on the extracted input video, and then output an output video to a display on which the output video is displayed. For example, the image processing apparatus may be incorporated into a television apparatus including a display, or may be an STB (Set Top Box) or the like that outputs a video to a display.

The characteristic extraction unit 101 calculates a characteristic value for each field of the input video. The characteristic value is output to the gamma correction control unit 107. A total amount value of a luminance of pixels included in the field is used as the characteristic value. The characteristic extraction unit also detects whether or not a scene change occurs between adjacent fields of the input video and outputs a determination result to the gamma correction control unit. In this embodiment, average luminance values of two consecutive fields (a first input image and a second input image) are compared, and when a difference is larger than a predetermined value, a scene change is determined to be present.

The pulldown signal detection unit 102 determines whether or not the input video has undergone 2-3 pulldown processing and outputs a result to the gamma correction control unit. A method of determining the presence of two or three consecutive fields created from an identical frame or a method of detecting a recognition signal indicating 2-3 pulldown processing, which has been embedded on a broadcast transmission side, may be used as a determination method. When the input video is an interlace signal generated by interlace scanning, the interlace-progressive conversion unit 103 performs interlace-progressive conversion as required to create a progressive signal. The frame rate conversion unit 104 modifies a number of displayed images per second using a conversion method instructed by the frame rate conversion setting unit 106. The frame rate conversion setting unit 106 sets a frame rate conversion method in accordance with a user operation or the like, and outputs a setting content to the frame rate conversion unit and the gamma correction control unit. The setting content includes a method of creating an intermediate image, a method of repeating an identical image, and so on such that a plurality of output images are associated with a field (or a frame) of the input video through respectively different methods.

Figure 2:
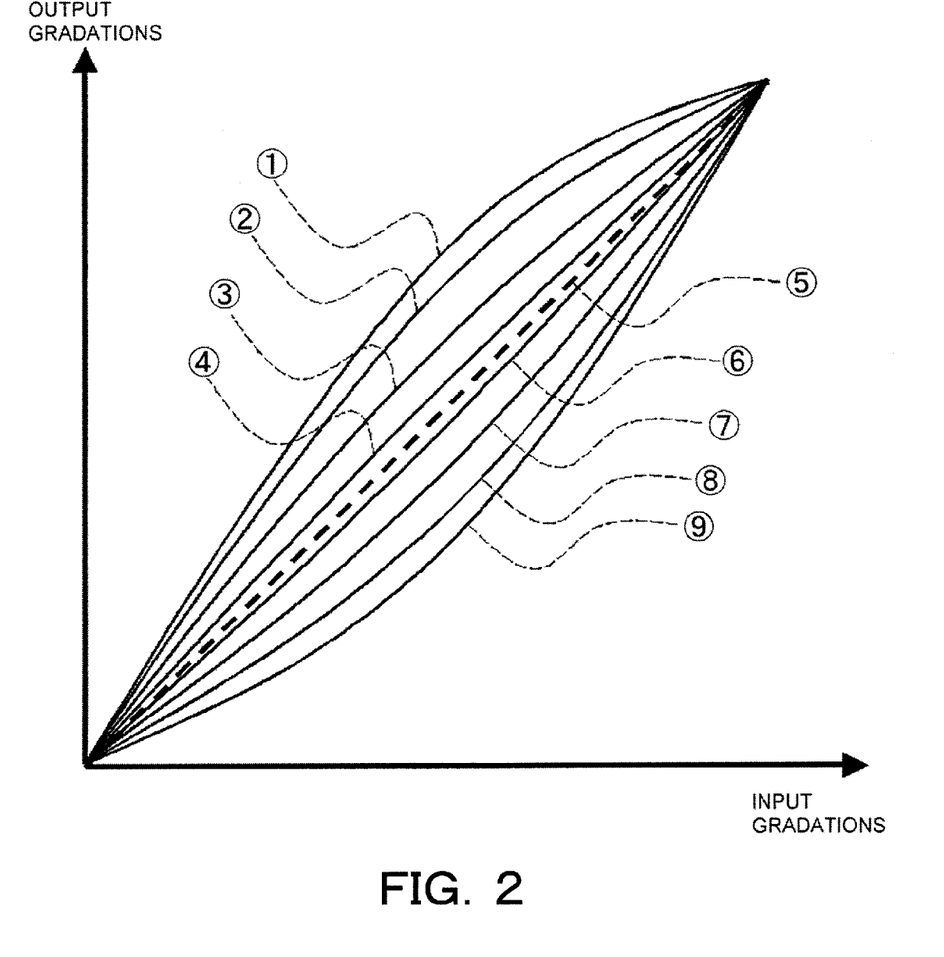
FIG. 2 is a view showing an example of a gamma curve.

The gamma correction unit 105 performs non-linear conversion processing on the input video using a gamma curve selected by the gamma correction control unit. The gamma correction control unit 107 selects an optimum gamma curve using the characteristic value and the presence of a scene change from the characteristic extraction unit, the determination result from the pulldown signal detection unit, and the setting content from the frame rate conversion setting unit, and outputs the selected gamma curve to the gamma correction unit. Examples of gamma curves are indicated by encircled numerals 1 to 9 in FIG. 2. In the drawing, the abscissa shows input gradations and the ordinate shows output gradations. The gamma correction control unit classifies the magnitude of the characteristic value according to nine gradations and selects any one of the gamma curves indicated by the encircled numerals 1 to 9 corresponding to the respective gradations. For example, when the characteristic value corresponds to the largest gradation, or in other words when the image has a maximum brightness level, the gamma curve 9 is selected to prevent highlight detail loss. Conversely, when the characteristic value corresponds to the smallest gradation, or in other words when the image is dark, the gamma curve 1 is selected to prevent shadow detail loss. When the characteristic value takes an intermediate value, one of the gamma curves 2 to 8 is selected in accordance with the value.

Note that the gamma correction unit corresponds to a luminance correction unit of the present invention. Further, the gamma curve corresponds to a luminance correction curve of the present invention, and although a so-called gamma curve is used in the embodiments, the luminance correction curve is not limited to a gamma curve as long as the luminance of the input image can be converted into the luminance of the output image. Further, the gamma correction control unit corresponds to a control unit of the present invention. Furthermore, in the embodiments, a method of selecting one of a plurality of gamma curves is used, but a gamma curve may be generated dynamically on the basis of the characteristic value of the input image. Alternatively, an appropriate gamma curve may be generated using a plurality of gamma curves.

In this embodiment, the input video is an interlace signal having a field frequency of 60 Hz, i.e. constituted by 60 fields per second. In other words, respective input images (fields) constituting the input video are switched at a rate of 60 images per second. Further, 2-3 pulldown processing is not implemented on the input video. Furthermore, the input video is subjected to interlace-progressive conversion. Moreover, an instruction indicating that "Frame rate conversion is not to be performed" is issued to the frame rate conversion setting unit by the user. In consideration of these prerequisites, a method employed by the gamma correction control unit to select a gamma curve and implement gamma correction will now be described.

Figure 3A:
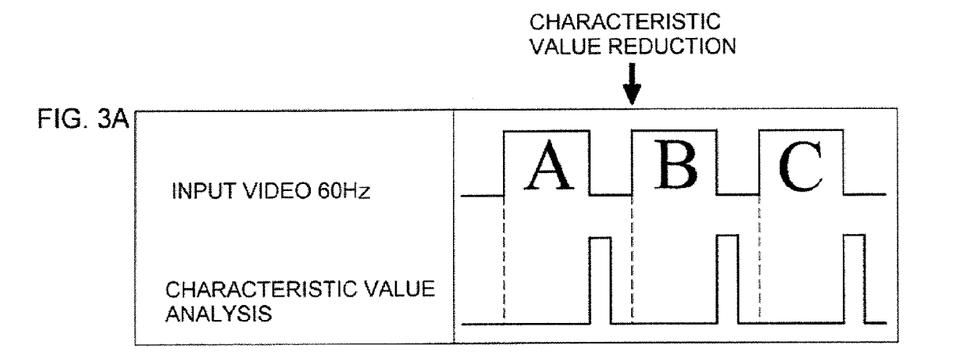

FIG. 3A shows a timing at which the characteristic extraction unit outputs the results of characteristic value calculation and scene change detection from the input video. As shown in the drawing, the results are output at a timing immediately before the end of a field. The gamma correction control unit selects a gamma curve on the basis of the output results and so on. The gamma correction unit then performs non-linear conversion processing based on the selected gamma curve to obtain an output video. Note that gamma curve selection by the gamma correction control unit is performed specifically by selecting an applied gamma instruction value. The applied gamma instruction value is a value specifying one of the gamma curves shown in FIG. 2, and is therefore represented by a numerical value between 1 and 9. As described above, the applied gamma instruction value increases as the characteristic value (the total amount value of the luminance, or in other words the brightness of the image) increases.

Figure 3B:
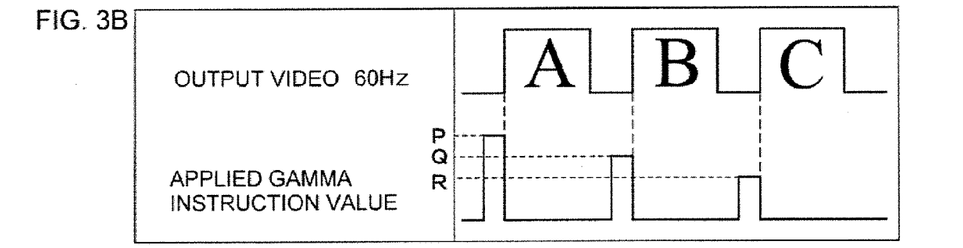
FIGS. 3B and 3C are views showing examples of an applied gamma instruction value according to the first embodiment.

FIG. 3B shows an applied gamma instruction value selected by the gamma correction control unit when a scene change does not occur and the characteristic value decreases greatly from a field A to a field B but does not vary from the field B to a field C. During the transition from the field A to the field B, the characteristic value decreases greatly, and when the applied gamma instruction value is set at a value corresponding to the characteristic value variation, the output image may suddenly become too bright, causing user discomfort. Therefore, as shown in FIG. 3B, the applied gamma instruction value applied to the output frame B is set at an intermediate value between the value applied to the output frame A and the original value corresponding to the characteristic value. When the amount by which the luminance of the output video varies is controlled in this manner, the gamma curve can be modified in frame units in a stepped fashion. As a result, an output video that does not cause user discomfort can be displayed.

Figure 3C:
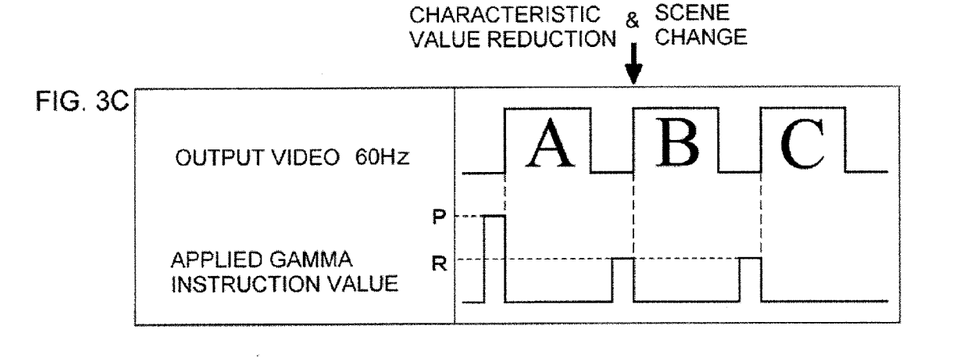

FIG. 3C shows an applied gamma instruction value selected by the gamma correction control unit when a scene change is detected between the fields A and B and the characteristic value decreases greatly from the field A to the field B but does not vary from the field B to the field C. In this case, a scene change occurs between the output frames A and B, and therefore the user does not experience a sense of discomfort even when the brightness of the images varies rapidly. Hence, the gamma correction control unit selects the applied gamma instruction value corresponding to the characteristic value as is, and then causes the gamma correction unit to perform correction. In a case where characteristic value variation is caused by a scene change, the original video cannot be reproduced when the gamma curve is varied in a stepped fashion, and therefore the sharpness of the displayed video may be lost. Hence, when a scene change is detected, gamma correction corresponding directly to the characteristic value is performed as described above, and as a result, favorable video display in which the reproducibility of the original video is high can be achieved.

Figure 4:
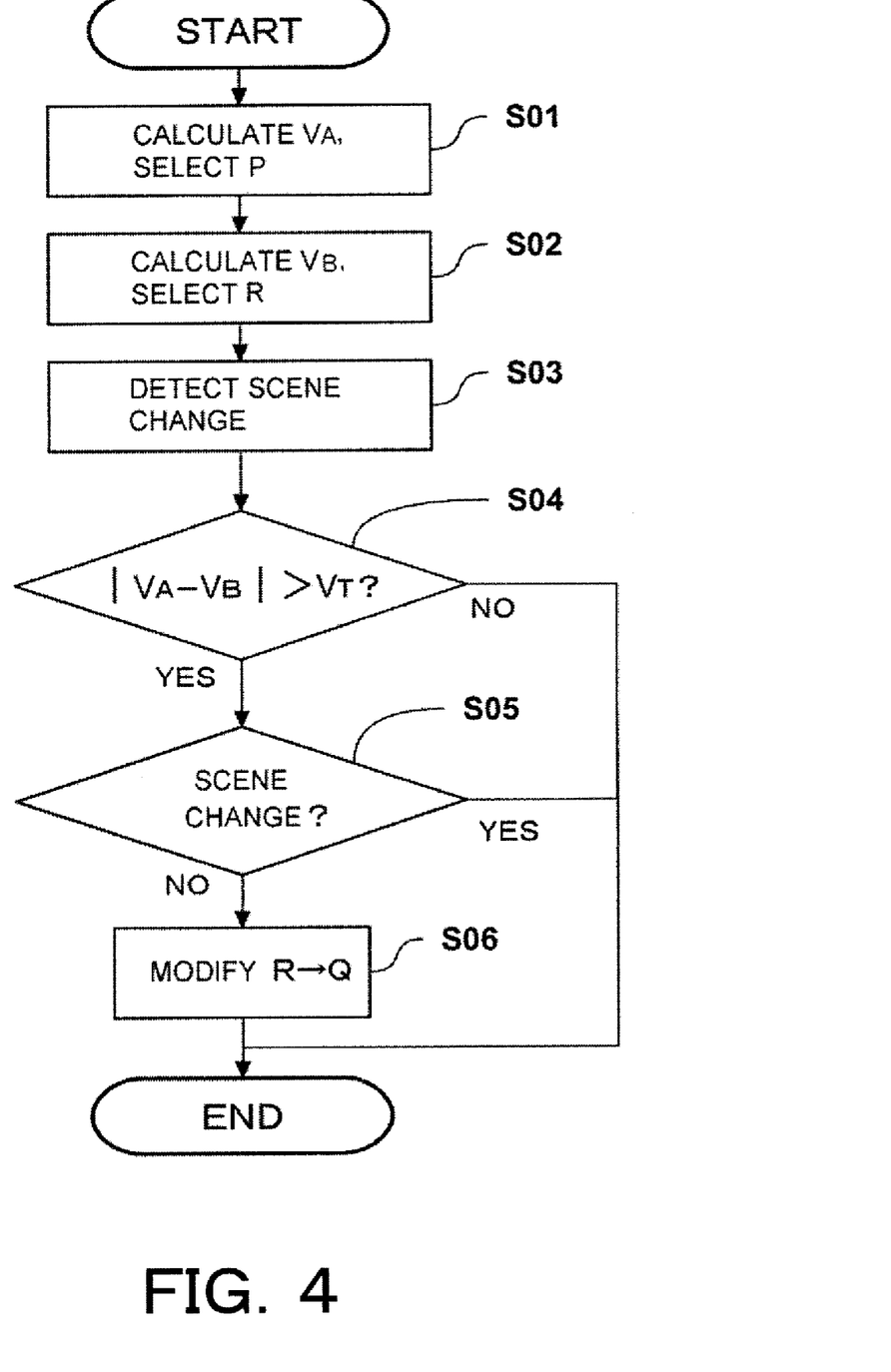
FIG. 4 is a flowchart illustrating gamma correction in a case where frame rate conversion is not performed.

The processing of FIGS. 3B and 3C will now be described further using a flowchart shown in FIG. 4. In a step S01, the characteristic extraction unit calculates a characteristic value VA and an average luminance value of the field A, and the gamma correction control unit selects an applied gamma instruction value P corresponding to VA. In a step S02, the characteristic extraction unit calculates a characteristic value VB and an average luminance value of the field B, and the gamma correction control unit selects an applied gamma instruction value R corresponding to VB. The applied gamma instruction values P and R are shown in FIGS. 3B and 3C, respectively. In a step S03, the characteristic extraction unit compares the average luminance values of the fields A and B to determine the presence of a scene change. In a step S04, the gamma correction control unit compares VA and VB to determine whether or not a difference between the two is larger than a predetermined value VT. When S04=NO is established, the gamma correction control unit confirms selection of the applied gamma instruction value R corresponding to the field B. When S04=YES is established, on the other hand, the gamma correction control unit decides to perform subsequent processing based on the presence of a scene change in a step S05. When S05=YES is established, the likelihood that the characteristic value variation is caused by a scene change is high, and therefore the gamma correction control unit confirms selection of the applied gamma instruction value R corresponding to the field B. When S05=NO is established, on the other hand, the gamma correction control unit modifies the applied gamma instruction value to Q in order to suppress rapid variation of the gamma curve.

Note that an average luminance value of the pixels included in the image may be used as the characteristic value of the image. Further, a luminance histogram having a luminance range on the abscissa and a pixel count on the ordinate may be created and the gamma curve may be selected on the basis of the shape of the histogram (on the basis of a peak value when the histogram can be approximated by a normal distribution, for example).

(Second Embodiment)

In this embodiment, the input video is an interlace signal having a field frequency of 60 Hz. Further, 2-3 pulldown processing is not implemented on the input video. Furthermore, the input video is subjected to interlace-progressive conversion. Moreover, an instruction indicating that "The signal is to be converted into a signal having a frame frequency of 120 Hz" is issued to the frame rate conversion setting unit by the user. In consideration of these prerequisites, a method employed by the gamma correction control unit to select a gamma curve and implement gamma correction will now be described. Note that the apparatus constitution is identical to the first embodiment.

In this embodiment also, the characteristic extraction unit outputs results relating to calculation of the characteristic value and the presence of a scene change at the timing indicated in FIG. 3A. The frame rate conversion unit then creates an interpolation frame as an interpolation image in accordance with the setting content of the frame rate conversion setting unit, and inserts the interpolation frame into a frame boundary of the output video.

Figure 5A:
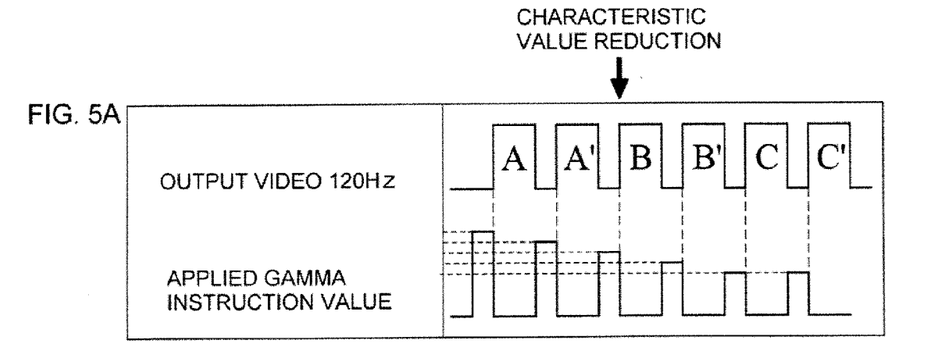
FIGS. 5A to 5C are views showing examples of an applied gamma instruction value according to a second embodiment.

FIG. 5A shows the applied gamma instruction value when a scene change does not occur and the characteristic value decreases greatly from the field A to the field B but does not vary from the field B to the field C. In this drawing, frame rate conversion is performed by the frame rate conversion unit using a method of creating an intermediate image from preceding and following frames. In other words, an intermediate image A', an intermediate image B', and an intermediate image C' are generated from frames A and B, frames B and C, and frame C and a subsequent frame, respectively. This method corresponds to a second interpolation method of the present invention. Here, the gamma correction control unit can perform detailed image processing by selecting an applied gamma instruction value for a video that has already undergone frame rate conversion. For example, an intermediate value between the applied gamma instruction values of the frames A and B is selected in relation to the intermediate image A'. As a result, the gamma characteristic can be modified smoothly without causing viewer discomfort.

Figure 5B:
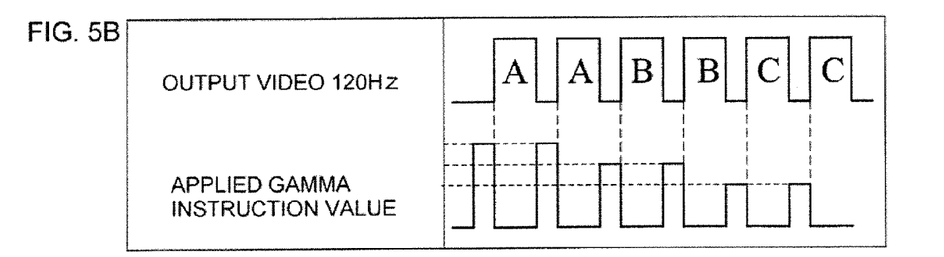

Meanwhile, FIG. 5B shows the applied gamma instruction value in a case where the frame rate conversion unit performs frame rate conversion using a method of repeating a preceding frame. This method corresponds to a first interpolation method of the present invention. As shown in the drawing, the gamma correction control unit selects an identical applied gamma instruction value in relation to identical images. In so doing, the reproducibility of the original video can be improved. By varying the applied gamma instruction value in a stepped fashion taking into consideration the frame rate conversion method in this manner, rapid brightness variation can be suppressed and the original video can be reproduced.

Figure 5C:
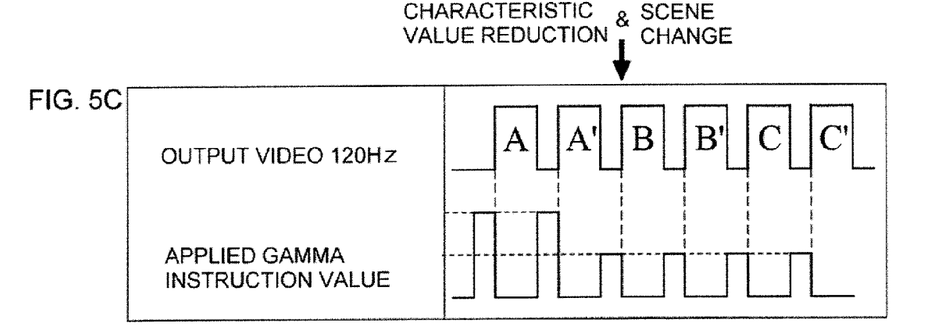

FIG. 5C shows the applied gamma instruction value selected by the gamma correction control unit when a scene change is detected between the fields A and B and the characteristic value decreases greatly from the field A to the field B but does not vary from the field B to the field C. In this case, a scene change occurs, and therefore the user does not experience a sense of discomfort even when the image brightness varies rapidly. Hence, the gamma correction control unit selects the applied gamma instruction value corresponding to the characteristic value as is.

Thus, gamma correction control can be performed appropriately by the gamma correction control unit in accordance with the characteristic value, the presence of a scene change, and the frame rate conversion method even when the frame rates of the input video and the displayed video differ, and as a result, a favorable gamma characteristic can be set.

(Third Embodiment)

In this embodiment, the input video is an interlace signal having a field frequency of 60 Hz. Further, 2-3 pulldown processing is implemented on the input video. Furthermore, the input video is not subjected to interlace-progressive conversion. Moreover, an instruction indicating that "The signal is to be converted into a signal having a frame frequency of 120 Hz" is issued to the frame rate conversion setting unit by the user. In consideration of these prerequisites, a method employed by the gamma correction control unit to select a gamma curve and implement gamma correction will now be described. Note that the apparatus constitution is identical to the first embodiment. Note also that although interlace-progressive conversion is not performed in this embodiment, processing is identical to a case in which interlace-progressive conversion is performed.

Figure 6A:
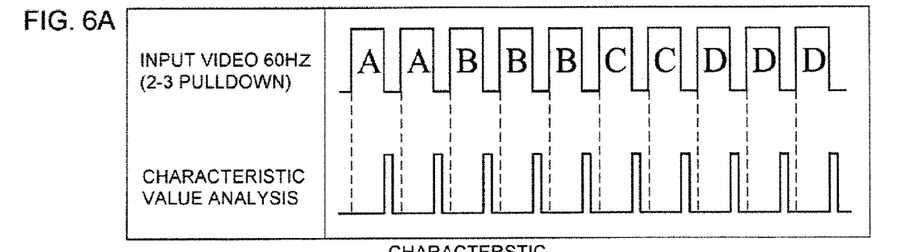
Figure 6B:
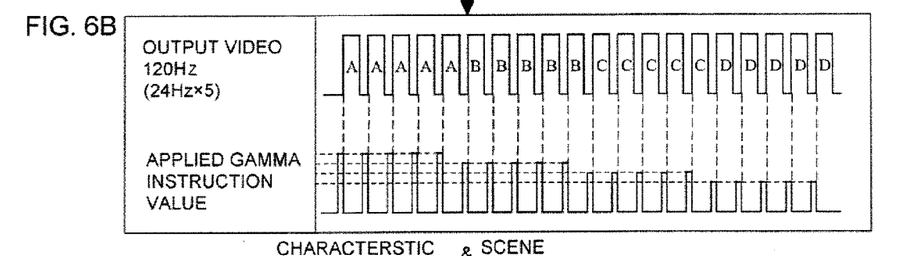
FIGS. 6B and 6C are views showing examples of an applied gamma instruction value according to the third embodiment.

FIG. 6A shows the constitution of an input video subjected to 2-3 pulldown processing. As shown in the drawing, an image A is displayed twice consecutively, an image B is displayed three times consecutively, an image C is displayed twice consecutively, and an image D is displayed three times consecutively. Hence, in the 2-3 pulldown processing, a frame rate difference is absorbed by creating two or three fields from a single frame of a cinema video. When the frame rate conversion unit converts an input video such as that shown in FIG. 6A into frame frequency 120 Hz, a single frame of the original cinema video is displayed five times consecutively, as shown in FIG. 6B. With this method, a video can be displayed at an identical timing to the original cinema video.

FIG. 6B shows the applied gamma instruction value selected by the gamma correction control unit when a scene change does not occur and the characteristic value decreases greatly from the field A to the field B but does not vary from the field B to a field D. As shown in the drawing, an identical applied gamma instruction value is used for frames created from an identical frame of the cinema video. Thus, a high-quality video that faithfully reproduces the original cinema video can be displayed. Furthermore, in this embodiment, a scene change does not occur, and therefore the gamma characteristic is varied gradually from the frame B to the frame D. In so doing, a situation in which the user experiences a sense of discomfort due to rapid variation in the brightness of the screen can be avoided.

Figure 6C:
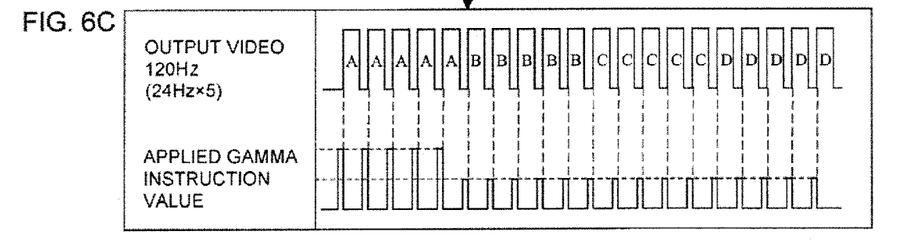

FIG. 6C shows the applied gamma instruction value selected by the gamma correction control unit when a scene change is detected between the fields A and B and the characteristic value decreases greatly from the field A to the field B but does not vary from the field B to the field D. In this case, a scene change occurs, and therefore the user does not experience a sense of discomfort even when the gamma characteristic varies rapidly. Hence, the gamma correction control unit applies the gamma characteristic corresponding to the characteristic value of the field B as is. Meanwhile, an identical applied gamma instruction value is used for frames created from an identical frame of the cinema video, and therefore the original video can be displayed with a high degree of reproducibility.

Hence, the gamma correction control unit can perform gamma correction control appropriately in accordance with the characteristic value and the presence of a scene change even when the input video is cinema video subjected to 2-3 pulldown processing such that the frame rate is converted. As a result, gamma characteristic modification suitable for a 24 frame-per-second cinema video can be performed, enabling faithful reproduction of the cinema video.

(Fourth Embodiment)

Figure 7A:
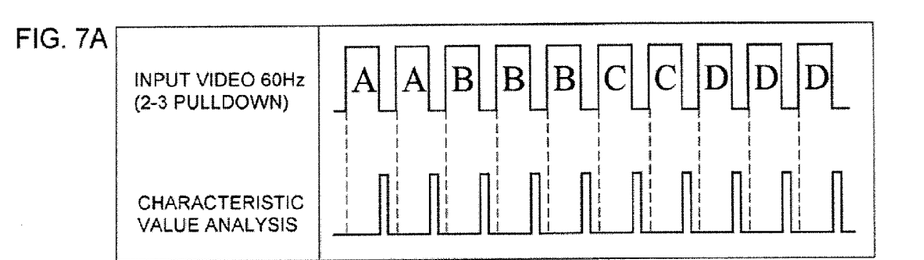

In this embodiment, the input video is an interlace signal having a field frequency of 60 Hz. Further, 2-3 pull down processing is implemented on the input video. Furthermore, the input video is not subjected to interlace-progressive conversion. Moreover, an instruction indicating that "Frame rate conversion is not to be performed" is issued to the frame rate conversion setting unit by the user. In consideration of these prerequisites, a method employed by the gamma correction control unit to select a gamma curve and implement gamma correction will now be described. Note that the apparatus constitution is identical to the first embodiment. Note also that the constitution of the input video shown in FIG. 7A is identical to that of the third embodiment described above using FIG. 6A.

Figure 7B:
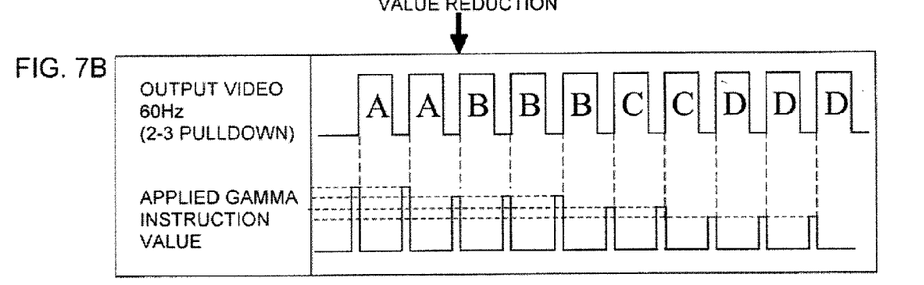
FIGS. 7B and 7C are views showing examples of an applied gamma instruction value according to the fourth embodiment.

FIG. 7B shows the applied gamma instruction value selected by the gamma correction control unit when a scene change does not occur and the characteristic value decreases greatly from the field A to the field B but does not vary from the field B to the field D. As shown in the drawing, an identical applied gamma instruction value is used for frames created from an identical frame of the cinema video. Thus, a high-quality video that faithfully reproduces the original cinema video can be displayed. Furthermore, in this embodiment, a scene change does not occur, and therefore the gamma characteristic is varied gradually from the frame B to the frame D. In so doing, a situation in which the user experiences a sense of discomfort due to rapid variation in the brightness of the screen can be avoided.

Figure 7C:
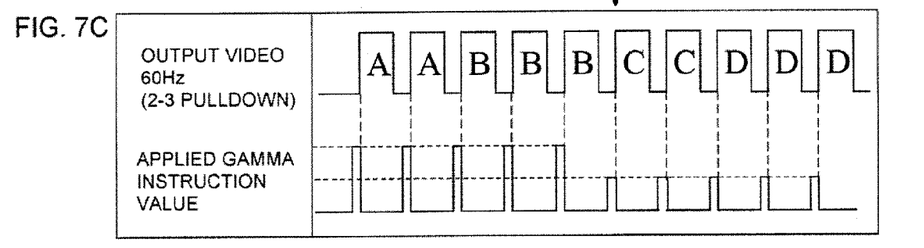

FIG. 7C shows the applied gamma instruction value selected by the gamma correction control unit when a scene change is detected between the fields B and C and the characteristic value decreases greatly from the field B to the field C but does not vary on other field boundaries. In this case, a scene change occurs, and therefore the user does not experience a sense of discomfort even when the gamma characteristic varies rapidly. Hence, the gamma correction control unit selects the applied gamma instruction value such that a gamma characteristic corresponding to the characteristic value of the field C is applied as is. Meanwhile, an identical applied gamma instruction value is used for frames created from an identical frame of the cinema video, and therefore the original video can be displayed with a high degree of reproducibility.

Hence, the gamma correction control unit can perform gamma correction control appropriately in accordance with the frame rate conversion method, the characteristic value, the presence of a scene change, and the pulldown detection result even when the input video is cinema video subjected to 2-3 pulldown processing. As a result, a 24 frame-per-second cinema video can be reproduced even more faithfully, and gamma modification can be performed favorably.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-104776, filed on Apr. 23, 2009, which is hereby incorporated by reference herein its entirety.

What is claimed is:

1. An image processing apparatus comprising:
    a characteristic extraction unit that extracts a characteristic value of a luminance in relation to respective input images constituting an input video and detects the presence of a scene change between adjacent input images;
    a control unit that determines a gamma correction curve to be applied to output images corresponding to the respective input images on the basis of a magnitude of the characteristic value extracted by said characteristic extraction unit; and
    a gamma correction unit that corrects a luminance of the respective output images, using the gamma correction curve determined by said control unit, wherein,
    when a difference in the characteristic value between a first input image and a subsequent second input image is larger than a predetermined value and a scene change does not exist between the first input image and the second input image, said control unit determines a gamma correction curve having an intermediate correction characteristic between a gamma correction curve corresponding to a characteristic value of the first input image and a gamma correction curve corresponding to a characteristic value of the second input image as the gamma correction curve to be applied to an output image corresponding to the second input image, and
    when the difference in the characteristic value is smaller than the predetermined value or a scene change exists between the first input image and the second input image, said control unit determines the gamma correction curve corresponding to the characteristic value of the second input image as the gamma correction curve to be applied to the output image corresponding to the second input image.

2. The image processing apparatus according to claim 1, wherein the characteristic value is a total amount value of a luminance of a plurality of pixels included in the input image.

3. The image processing apparatus according to claim 1, further comprising
    a frame rate conversion unit that inserts an interpolation image created using either a first interpolation method or a second interpolation method between adjacent input images, wherein,
    in the first interpolation method, the interpolation image is created by repeating an immediately preceding image and in the second interpolation method, the interpolation image is created from preceding and following images, and
    said control unit determines a gamma correction curve to be applied to the interpolation image in accordance with the interpolation method used to create the interpolation image.

4. The image processing apparatus according to claim 3, wherein,
    when the interpolation image is created using the first interpolation method, said control unit applies to the interpolation image an identical gamma correction curve to that of the immediately preceding image, and
    when the interpolation image is created using the second interpolation method, said control unit determines the gamma correction curve to be applied to the interpolation image on the basis of gamma correction curves applied to the preceding and following images.

5. The image processing apparatus according to claim 1, further comprising
    a pulldown signal detection unit that determines whether or not the input video is a video created from a 24 frame-per-second cinema video through 2-3 pulldown processing, wherein,
    when a detection result indicates that the input video has been created through 2-3 pulldown processing, said control unit applies an identical gamma correction curve to output images created from an identical frame of the cinema video.

6. An image processing method comprising the steps of:
    extracting a characteristic value of a luminance in relation to respective input images constituting an input video;
    detecting the presence of a scene change between adjacent input images;
    determining a gamma correction curve to be applied to output images corresponding to the respective input images on the basis of a magnitude of the extracted characteristic value; and
    correcting a luminance of the respective output images using the determined gamma correction curve, wherein,
    when a difference in the characteristic value between a first input image and a subsequent second input image is larger than a predetermined value and a scene change does not exist between the first input image and the second input image, a gamma correction curve having an intermediate correction characteristic between a gamma correction curve corresponding to a characteristic value of the first input image and a gamma correction curve corresponding to a characteristic value of the second input image is determined in said determining step as the gamma correction curve to be applied to an output image corresponding to the second input image, and when the difference in the characteristic value is smaller than the predetermined value or a scene change exists between the first input image and the second input image, the gamma correction curve corresponding to the characteristic value of the second input image is determined in said determining step as the gamma correction curve to be applied to the output image corresponding to the second input image.

7. The image processing method according to claim 6, wherein the characteristic value is a total amount value of a luminance of a plurality of pixels included in the input image.

8. The image processing method according to claim 6, further comprising
- a step of inserting an interpolation image created using either a first interpolation method or a second interpolation method between adjacent input images,
- wherein, in the first interpolation method, the interpolation image is created by repeating an immediately preceding image and in the second interpolation method, the interpolation image is created from preceding and following images, and
- said determining step includes determining a gamma correction curve to be applied to the interpolation image in accordance with the interpolation method used to create the interpolation image.

9. The image processing method according to claim 8, wherein,
- when the interpolation image is created using the first interpolation method, said determining step includes applying to the interpolation image an identical gamma correction curve to that of the immediately preceding image, and
- when the interpolation image is created using the second interpolation method, said determining step includes determining the gamma correction curve to be applied to the interpolation image on the basis of gamma correction curves applied to the preceding and following images.

10. The image processing method according to claim 6, further comprising
- a pulldown signal detection step of determining whether or not the input video is a video created from a 24 frame-per-second cinema video through 2-3 pulldown processing,
- wherein, when a detection result indicates that the input video has been created through 2-3 pulldown processing, said determining step includes applying an identical gamma correction curve to output images created from an identical frame of the cinema video.

* * * * *